(12) United States Patent
Shipp et al.

(10) Patent No.: US 9,809,113 B2
(45) Date of Patent: *Nov. 7, 2017

(54) VEHICLE FUEL TANK SYSTEM FOR IMPROVED CRASHWORTHINESS

(71) Applicant: ROBSON FORENSIC, INC., Lancaster, PA (US)

(72) Inventors: Erin Marie Shipp, Charleston, SC (US); Peter J. Leiss, Middletown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/887,898

(22) Filed: Oct. 20, 2015

(65) Prior Publication Data

US 2016/0039281 A1 Feb. 11, 2016

Related U.S. Application Data

(63) Continuation of application No. 14/520,676, filed on Oct. 22, 2014, now Pat. No. 9,216,647, which is a (Continued)

(51) Int. Cl.
*B60K 15/067* (2006.01)
*B60K 15/063* (2006.01)
(Continued)

(52) U.S. Cl.
CPC .......... *B60K 15/067* (2013.01); *B60K 15/063* (2013.01); *B60K 15/07* (2013.01);
(Continued)

(58) Field of Classification Search
CPC ...... B60K 15/00; B60K 15/03; B60K 15/063; B60K 15/0634; B60K 15/067;
(Continued)

(56) References Cited

U.S. PATENT DOCUMENTS 1,148,842 A 8/1915 Huff
1,760,457 A 5/1930 Walker
(Continued)

FOREIGN PATENT DOCUMENTS

CA 2553752 A1 7/2005
DE 3722034 C1 9/1988
(Continued)

*Primary Examiner* — Joseph M Rocca
*Assistant Examiner* — Maurice L Williams
(74) *Attorney, Agent, or Firm* — McNee Wallace & Nurick LLC (57) ABSTRACT

A fuel tank system which has a revised mounting system and a revised location for the fuel system and fuel tanks to improve crashworthiness of the vehicle by reducing the occurrence of tank failure, fuel spillage, fire and/or explosion during and after a collision or similar event, while still providing a sufficient range for the vehicle. The fuel tanks are protected from damage from the side, bottom and between the tanks. The fuel tank mounting system also allows the energy associated with an event to be managed, such as by allowing the fuel tanks to be pushed or moved downwardly and/or laterally by the energy of the impact of a collision or similar event to a position in which the fuel tank is either out of the path of the impact or protected by the chassis or frame of the vehicle.

19 Claims, 8 Drawing Sheets

Related U.S. Application Data continuation of application No. 14/149,957, filed on Jan. 8, 2014, now Pat. No. 9,321,346.

(60) Provisional application No. 61/750,418, filed on Jan. 9, 2013.

(51) Int. Cl.
  *B60K 15/073* (2006.01)
  *B60K 15/07* (2006.01)
  *B60K 15/03* (2006.01)

(52) U.S. Cl.
  CPC .. *B60K 15/073* (2013.01); *B60K 2015/03407* (2013.01); *B60K 2015/0634* (2013.01); *B60K 2015/0675* (2013.01); *B60Y 2200/14* (2013.01); *B60Y 2200/221* (2013.01); *B60Y 2306/01* (2013.01)

(58) Field of Classification Search
  CPC .............. B60K 15/0675; B60K 15/073; B60K 2015/03407; B60K 2015/03453
  See application file for complete search history.

(56) References Cited

U.S. PATENT DOCUMENTS

| | | |
|---|---|---|
| 2,276,963 A | 3/1942 | Griffin |
| 2,465,173 A | 3/1949 | Scales et al. |
| 2,622,887 A | 12/1952 | Prior |
| 3,227,410 A | 1/1966 | McCuen |
| 3,511,515 A | 5/1970 | Cline et al. |
| 3,552,596 A | 1/1971 | Landon |
| 4,371,181 A | 2/1983 | Monigold et al. |
| 4,444,373 A | 4/1984 | Hayashi |
| 4,506,756 A | 3/1985 | Bergous |
| 4,610,453 A | 9/1986 | Collier |
| 4,621,822 A | 11/1986 | Knochelmann et al. |
| 4,723,810 A | 2/1988 | Kanemaru et al. |
| 4,919,226 A * | 4/1990 | Rana .................. B60K 15/063 180/274 |
| 5,380,042 A | 1/1995 | Hively et al. |
| 5,443,578 A | 8/1995 | Davis, Jr. |
| 5,496,069 A | 3/1996 | Milligan |
| 5,547,224 A | 8/1996 | Kami et al. |
| 5,556,133 A | 9/1996 | Oku et al. |
| 5,673,939 A | 10/1997 | Bees et al. |
| 5,673,940 A | 10/1997 | Gaisford et al. |
| 5,762,145 A | 6/1998 | Bennett |
| 6,059,252 A | 5/2000 | Emmann et al. |
| 6,099,042 A | 8/2000 | Cook et al. |
| 6,109,290 A | 8/2000 | Sabatinelli |
| 6,692,028 B2 | 2/2004 | Koster |
| 6,905,162 B2 | 6/2005 | Marrs et al. |
| 7,264,277 B2 | 9/2007 | Ono et al. |
| 7,631,901 B2 | 12/2009 | Diehl |
| 7,641,254 B2 | 1/2010 | Stegawski et al. |
| 7,819,431 B2 | 10/2010 | Minami |
| 7,913,788 B1 | 3/2011 | Bryer et al. |
| 8,276,698 B2 * | 10/2012 | Guss .................. B60K 1/04 180/65.1 |
| 8,579,331 B2 | 11/2013 | Hayashi et al. |
| 2005/0046169 A1 | 3/2005 | Pfohl et al. |
| 2006/0061081 A1 | 3/2006 | Kresse, Jr. et al. |
| 2006/0214416 A1 * | 9/2006 | Watanabe .............. B60K 15/03 280/834 |
| 2008/0017430 A1 | 1/2008 | Marsala et al. |
| 2010/0213741 A1 | 8/2010 | Suzuki et al. |
| 2010/0276165 A1 | 11/2010 | Hobson et al. |
| 2013/0043702 A1 | 2/2013 | Hettinger et al. |
| 2013/0264347 A1 | 10/2013 | Fujita |

FOREIGN PATENT DOCUMENTS

| | | |
|---|---|---|
| DE | 4018197 A1 | 12/1991 |
| DE | 19820338 A1 | 11/1999 |
| DE | 102009039469 A1 | 3/2011 |
| DE | 102011100395 A1 | 1/2012 |
| DE | 202012103321 U1 | 11/2012 |
| DE | 102011117331 A1 | 5/2013 |
| DE | 102012023154 A1 | 8/2013 |
| EP | 0066963 A2 | 12/1982 |
| EP | 0067576 A1 | 12/1982 |
| EP | 1510393 A1 | 3/2005 |
| EP | 1564058 A1 | 8/2005 |
| FR | 1476592 A | 4/1967 |
| FR | 2785576 A1 | 5/2000 |
| FR | 2957888 A1 | 9/2011 |
| GB | 2120987 A | 12/1983 |
| JP | 2005-225414 | 8/2005 |
| JP | 2006-273147 | 10/2006 |
| JP | 2008092451 A | 4/2008 |
| WO | 2011/052661 A1 | 5/2011 |

* cited by examiner

VEHICLE FUEL TANK SYSTEM FOR IMPROVED CRASHWORTHINESS

FIELD OF THE INVENTION

The present invention is directed to a fuel system with one or more fuel tanks for motor vehicles, including, but not limited to, cars, busses and heavy duty trucks. More particularly, the invention is directed to a fuel tank which is pushed or moved downwardly and/or laterally by the energy of the impact of an event to a position in which the fuel tank is either out of the path of the impact or protected by the chassis of the vehicle.

BACKGROUND OF THE INVENTION

It is generally known that in configuring a motor vehicle with a fuel tank, it is important to prevent the fuel tank from damage and spillage during the crash. There are several strategies that have been employed in automotive design to meet those desires and requirements.

Those strategies include, but are not limited to, placing the fuel tank away from the perimeter of the vehicle, ensuring crush space is provided to absorb crash energy before the fuel tank is affected, constructing the fuel tank of materials that are not easily cut or torn, applying shields in areas of the fuel tank that may be vulnerable, routing all supply lines in protected areas, and providing the filler with a check valve to prevent leakage. In addition, many fuel tanks are positioned in large cages or structures which are designed to absorb the impact of a crash or event. Other than attempting to absorb the impact, known systems do not use the energy of the impact to move the fuel tank downwardly and/or laterally to a position in which the fuel tank is either out of the path of the impact or protected by the chassis of the vehicle.

Automobiles and light trucks must pass standards for fuel tank leakage in all mandated crash tests that range from frontal impacts to side impacts to rear impacts. However, these standards do not require that the fuel tanks be moveable away from the frame of the vehicle during a collision or other such event. In addition, heavy trucks other than school buses have no federal requirements for crashworthiness of the fuel system.

Currently, most manufacturers of heavy trucks mount thin wall aluminum or steel tanks to the outside of the frame rails for carrying fuel. Due to the location and construction of the fuel tanks in heavy trucks, the tank is exposed to crushing during various crash events, resulting in an increased possibility of fuel spillage, fire and explosion. These risks are a known hazard in fuel storage areas of vehicles and are considered significant if there is an accident causing an object, such as, but not limited to, debris from an accident or guide rail, to penetrate the fuel tank. Rupturing of fuel tanks is believed to be a common reason for fires or explosions.

It would be desirable to provide a vehicle fuel tank system which overcomes the problems stated above. It would also be desirable to provide for revised placement and protection for the fuel tanks and fuel system, allowing the vehicle and the fuel tanks to manage the energy generated by a collision or event, such as, but not limited to allowing the fuel tank to be moved relative to or away from the frame of the vehicle during a collision or similar event, thereby improving crashworthiness and reducing the occurrence of tank failure, fuel spillage, fire and/or explosion.

SUMMARY OF THE INVENTION

The invention provides a revised mounting system and a revised location for the fuel system and fuel tanks to improve crashworthiness of the vehicle by reducing the occurrence of tank failure, fuel spillage, fire and/or explosion during and after a collision or similar event, while still providing a sufficient range for the vehicle. The fuel tanks are protected from damage from the side, bottom and between the tanks. The fuel tank mounting system also allows the energy associated with an event to be managed, such as by allowing the fuel tanks to be pushed or moved downwardly and/or laterally by the energy of the impact of a collision or similar event to a position in which the fuel tank is either out of the path of the impact or protected by the chassis or frame of the vehicle.

In one embodiment, a fuel tank system for use with a vehicle, such as, but not limited to, a heavy duty vehicle is provided. The fuel tank system includes at least one fuel tank and a support structure. The support structure provides impact protection to the fuel tank. The support structure has mounting members and a base plate. The mounting members mount the support structure to frame members of the vehicle. The base plate extends between the mounting members. At least a portion of the fuel tank is positioned between the mounting members and the base plate, with the fuel tank being supported by the base plate. The support structure is moveable relative to the vehicle and the fuel tank during an impact of an event such as, but not limited to a collision, crash or accident. The fuel tank is also moveable relative to the vehicle and the support structure during the impact. Wherein the support structure protects the fuel tank from being crushed or punctured during the impact.

In one embodiment, a fuel tank system for use with a truck, such as, but not limited to, a heavy duty truck is provided. The fuel tank system includes a fuel tank and a support structure. The support structure provides impact protection to the fuel tank. The support structure has mounting members and a base plate. The mounting members mount the support structure to frame members of the truck. The base plate extends between the mounting members. A first portion of the fuel tank extends between a first frame member of the truck and a drive shaft of the truck, A second portion of the fuel tank extends between a second frame member of the truck and the drive shaft of the truck. The fuel tank is supported by the base plate. The fuel tank is moveable relative to the vehicle and the support structure during an impact of an event such as, but not limited to a collision, crash or accident. The support structure protects the fuel tank from being crushed or punctured during the impact. In one embodiment, a fuel tank system for use with a truck, such as, but not limited to, a heavy duty truck is provided. The fuel tank system includes a fuel tank and a support structure. The support structure provides impact protection to the fuel tank. The support structure has sidewalls, a front wall, a back wall and a base plate. The sidewalls mount the support structure to frame members of the truck. The base plate extends between the mounting members. A first portion of the fuel tank extends between a first frame member of the truck and a drive shaft of the truck, A second portion of the fuel tank extends between a second frame member of the truck and the drive shaft of the truck. The fuel tank is supported by the base plate. The support structure moveable relative to the vehicle and the fuel tank during an impact of an event such as, but not limited to a collision, crash or accident. The support structure protects the fuel tank from being crushed or punctured during the impact.

The use of the support structure provides both impact and tearing protection for the tank. This support structure also allows mounting of other components such as exhaust, air tanks and emission control systems to the outside of the structure. These mounted components will further act as energy absorbing members, further protecting the tank. The support structure also allows mounting of additional energy absorbing devices or structures as needed.

The support structure absorbs a portion of the energy or force of the impact, thereby reducing the energy or force transferred to the fuel tank.

The bottom plate will protect the bottom of the tank from crush or puncture and serve as a skid plate if ground contact is made. The front edge of the bottom plate may be turned up to allow for protection to the front side of the tank or tanks. The bottom plate also provides a location for mounting and location hardware and brackets for the tank.

The support structure may be mounted to tank locating brackets attached to the bottom plate. This may be formed in a U-section with wings which will serve as tank retention brackets.

Additional protection may be provided by energy absorbing capabilities of accessories mounted outside of the tanks and energy absorbing brackets.

In one embodiment, the fuel lines are routed within the structure and the frame rails. The tanks would be filled from a tube routed out the rear side of the tanks and structure with an integrated check system in the tank to prevent in the event of failure of this hose.

Additionally, a support member may extend between a respective mounting member and the base plate. The support member is configured to fail, allowing the mounting members, the base plate and the fuel tank to move relative to the frame members and the vehicle. The support member has a clamping load which is greater than twice a longitudinal acceleration or braking force generated by the vehicle.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring now to the drawings wherein like reference characters refer to like and corresponding parts throughout the several views, there is shown in FIGS. 1 through 4 two fuel tanks 10 which are part of a fuel system 12 for a motor vehicle, such as, but not limited to, a car, bus, tractor of a tractor trailer truck, other heavy trucks or similar type vehicles. While two fuel tanks are shown, at least one fuel tank or other numbers of fuel tanks may be used without departing from the scope of the invention.

Each fuel tank 10 can be made in one piece, as shown in the drawings. Alternatively, the fuel tanks can be made using conventional methods, such as, but not limited to, having a bottom pan member and a top pan member joined in any conventional manner, such as by a series of continuous welds which fasten together flanges of the bottom pan member and the top pan member. The material used to form the fuel tanks can be any material which will not degrade or fail when exposed to the fuel (i.e. diesel) which is stored in the fuel tanks 10, such as, but not limited to, polyethylene.

An inlet pipe or tube (not shown) is secured to the fuel tank 10, for example through a top wall 18 of the tank 10. The inlet tube may be secured to the fuel tank 10 in any known manner. The inlet tube is for the purpose of introducing diesel or other desired fuel into the respective tank 10. The inlet tube may be secured to the fuel tank 10 at various locations, including, but not limited to, near the rearward end of the tank 10. A fuel feed tube or pipe (not shown) extends from the fuel tank 10, for example through a bottom wall 22, for the purpose of feeding the fuel to the engine of the vehicle. The feed tube or pipe may be located at various locations, including, but not limited to, near the forward end of the tank 10.

Figure 1:
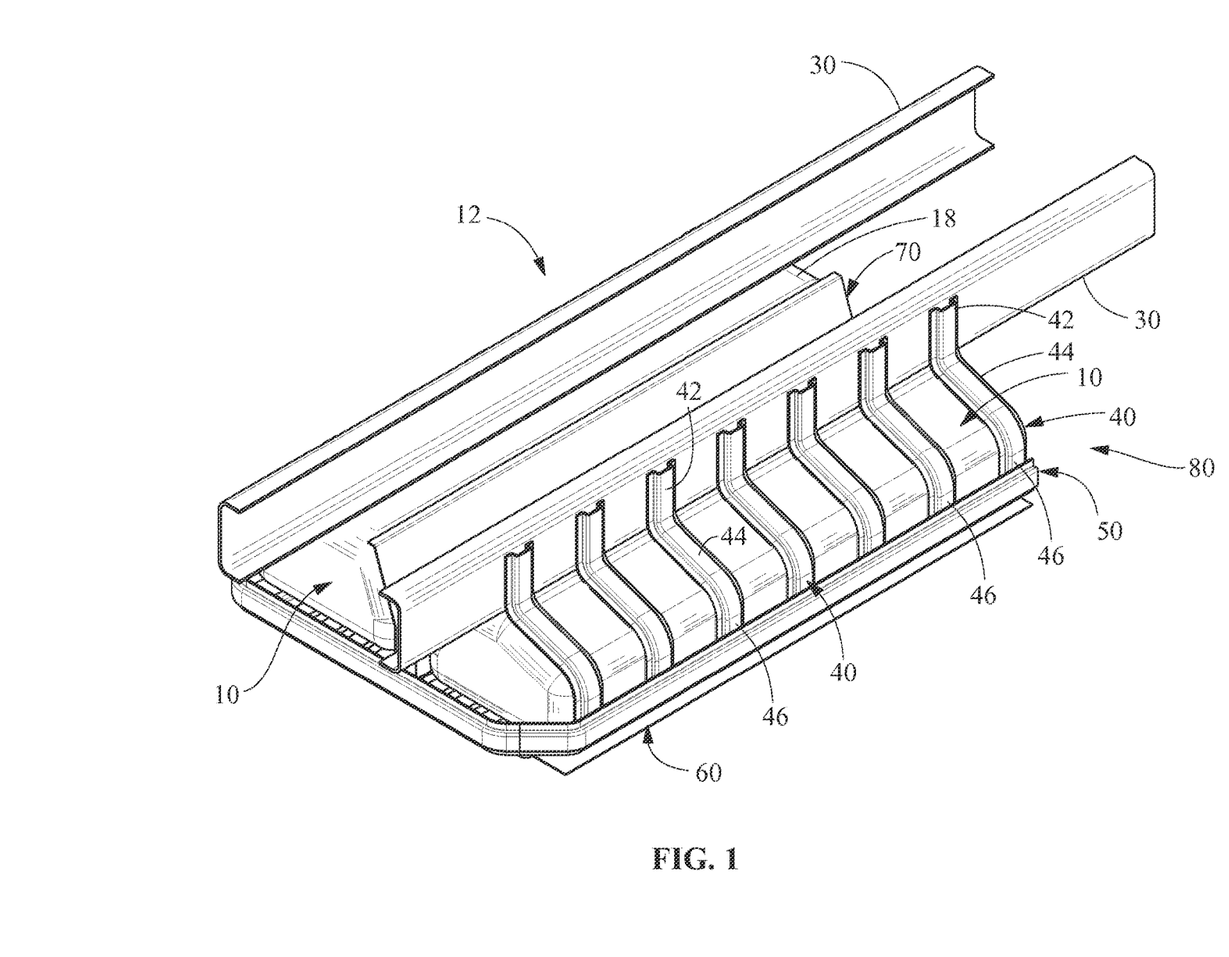
FIG. 1 is a perspective view of components of an illustrative embodiment of a fuel system according to the present invention.
Figure 2:
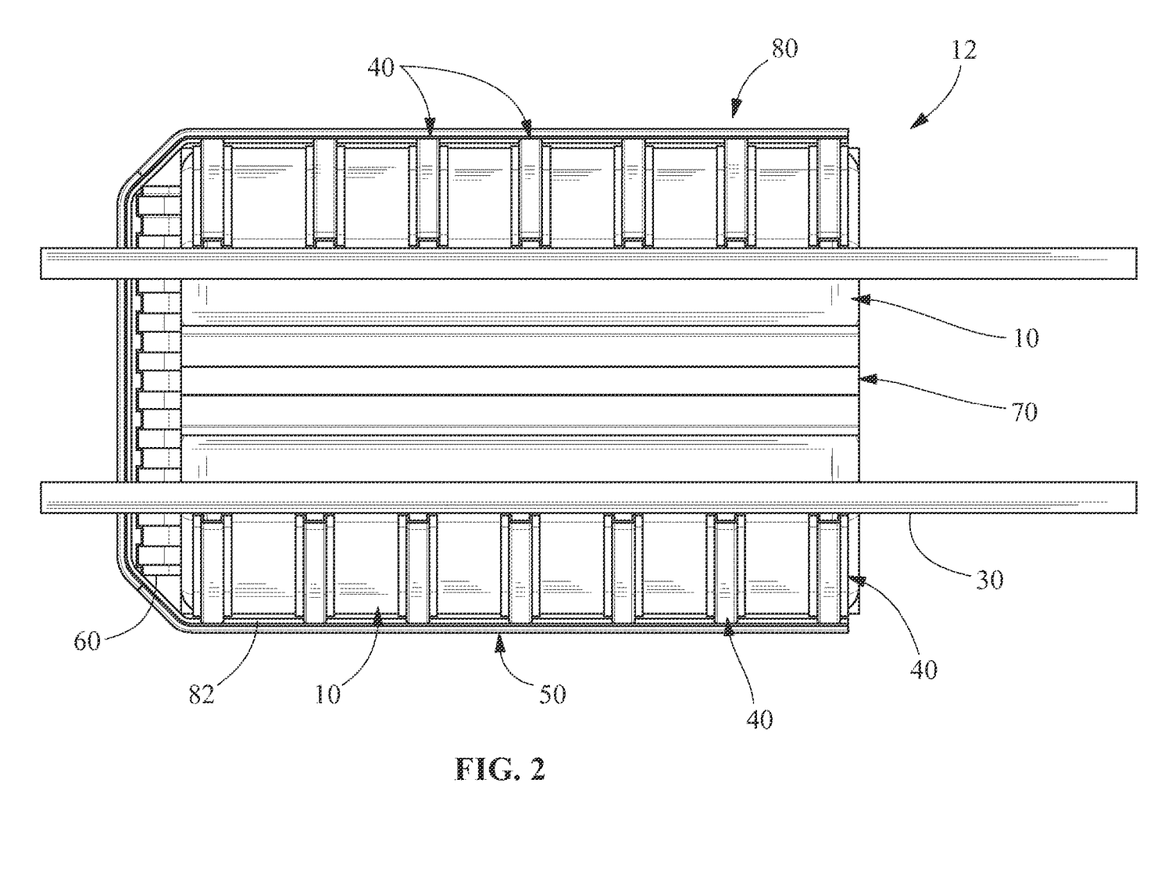
FIG. 2 is a top view of the fuel system of FIG. 1.
Figure 3:
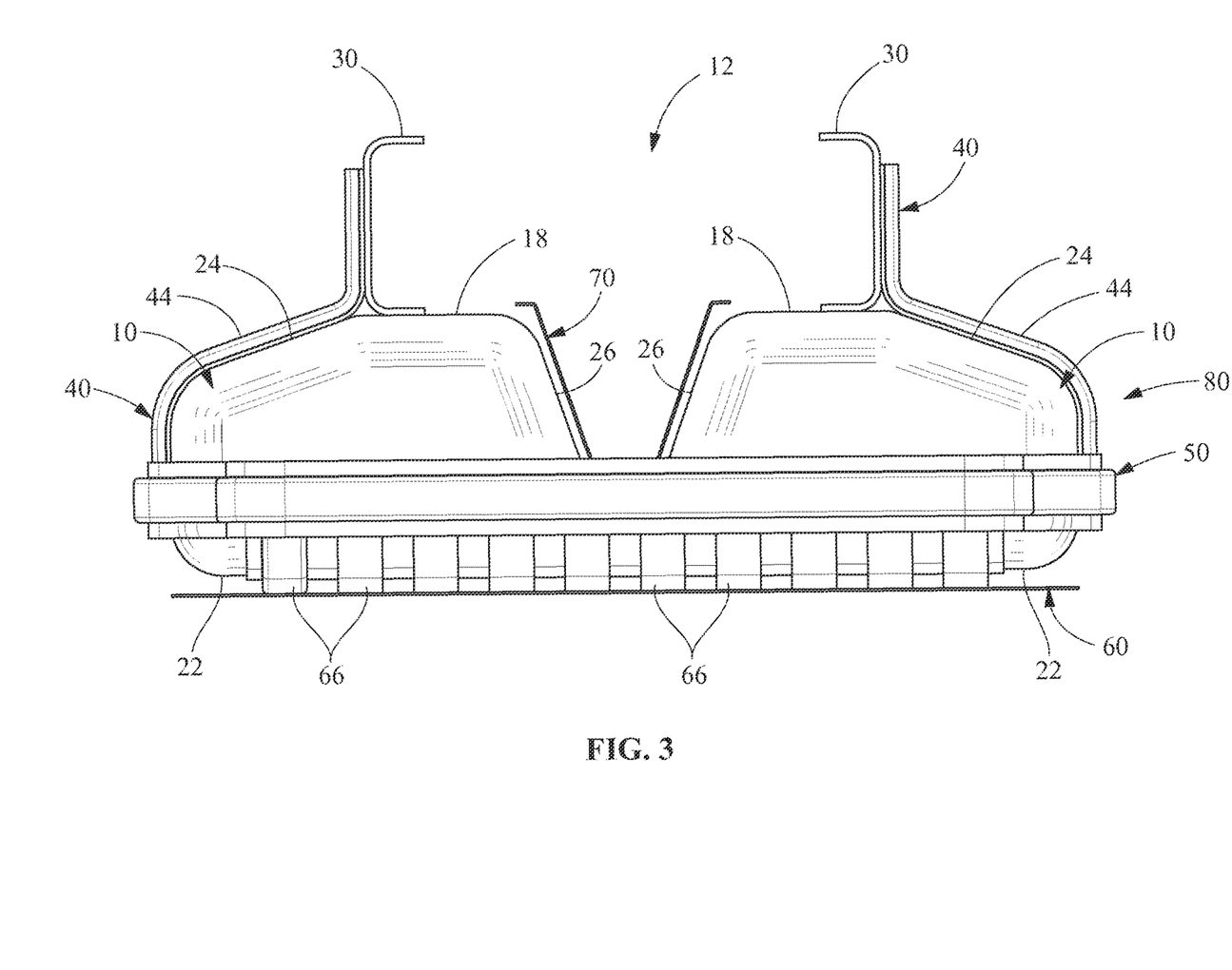
FIG. 3 is a front view of the fuel system of FIG. 1.
Figure 4:
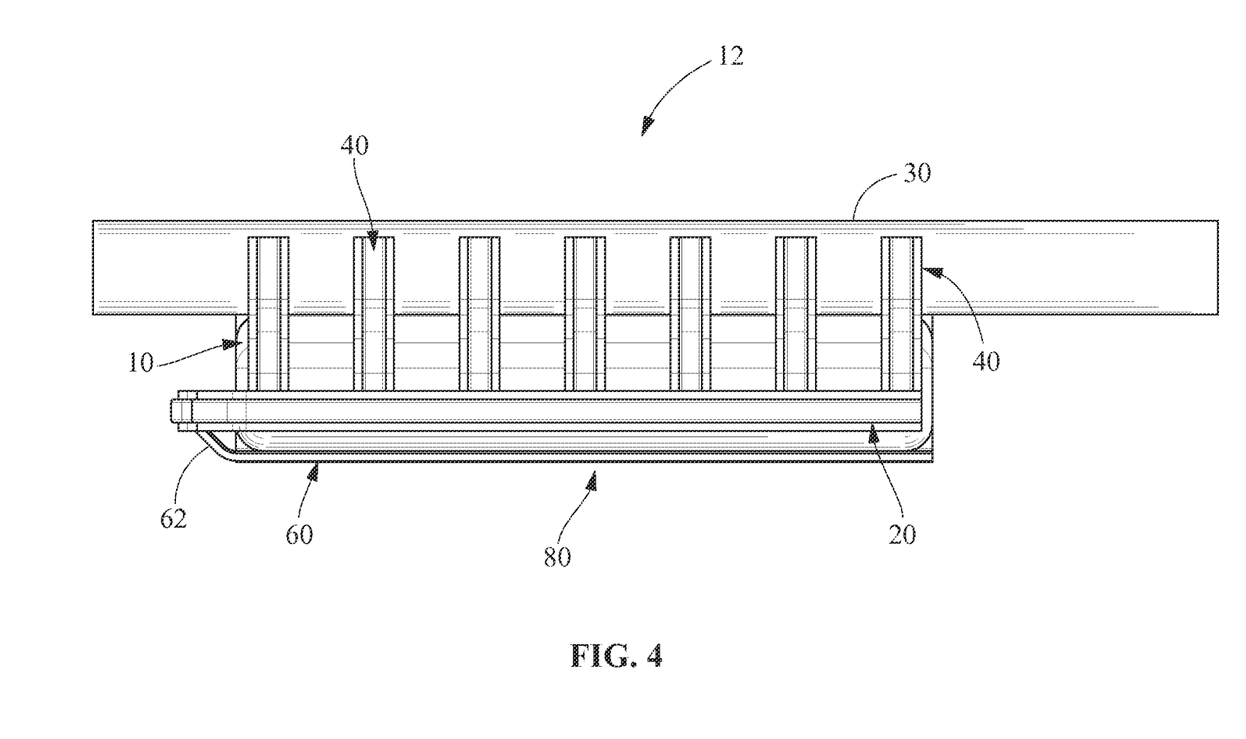
FIG. 4 is a side view of the fuel system of FIG. 1.

As best shown in FIGS. 1 and 3, the tanks 10 are adapted to be horizontally attached to the underside of the truck or vehicle so that the top walls 18 and the bottom walls 22 of the tanks are essentially parallel to the plane of the longitudinal axis of frame rail members 30 of the truck or motor vehicle and essentially parallel to the longitudinal axis of the drive shaft or drive line (not shown) of the vehicle. It should be understood that the cross section and overall shape of the fuel tanks 10 can be of any desired modification based on the space available for the tanks 10 and the desired capacity of the tank 10. In the embodiment shown in FIGS. 1 through 4, sloped walls 24, 26 (as best shown in FIG. 3) extend from top walls 18. Sloped walls 24 are dimensioned to cooperate with mounting members 40, as will be more fully described. Sloped walls 26 are configured to allow the fuel tanks 10 to be installed between the frame rail members 30 and proximate to the drive shaft. This configuration of the sloped surfaces 24, 26 facilitates the fuel tanks 10 to be pushed downward and sideways during an event, such as, but not limited to, a collision, crash or accident.

As any force is applied to the fuel tank system 12 and/or the fuel tanks 10 during such an event, the sloped surfaces 24, 26 cause any laterally applied forces to the sloped surfaces 24, 26 to exhibit a partial downward or vertical force and a partial lateral or horizontal force on the fuel tanks 10, causing the fuel tanks 10 to be moved relative to the frame rail members 30 of the vehicle and relative to the drive shaft. The movement of the fuel tanks 10 relative to the vehicle and the frame rail members 30 may be, but is not limited to, i) in a direction which is horizontal or lateral to the direction of the longitudinal axis of the frame rail members 30, ii) in a direction which is vertical or perpendicular to the direction of the longitudinal axis of the frame rail members 30, or iii) in a direction which is both horizontal or lateral to the direction of the longitudinal axis of the frame rail members 30 and vertical or perpendicular to the direction of the longitudinal axis of the frame rail members 30. This allows the fuel tanks 10 to be pushed or moved downwardly and/or laterally by the energy of the impact to a position in which the fuel tank is either out of the path of the impact or protected by the chassis of the vehicle, for example to a position away from one or more of the frame rail members 30 and the drive shaft of the vehicle.

The fuel tank system 12 described herein manages the energy created by an event to manipulate or move the fuel tanks 10 to a position in which the fuel tanks 10 are less prone to failure during or after the event thereby improving crashworthiness and reducing the occurrence of tank failure, fuel spillage, fire and/or explosion.

As best shown in FIG. 1, the fuel system 12 includes the fuel tanks 10, mounting members 40, at least one rail 50 and at least one bottom plate 60. The mounting members 40, the rail 50 and the bottom plate 60 form a support structure or cage 80 which surrounds the fuel tank(s) 10. The mounting members 40 have an S-shaped configuration with a first end section 42, a middle section 44 and a second end section 46. The first end section 42 of each mounting member 40 is mounted to a respective frame member 30 of the vehicle using known mounting methods, such as, but not limited to, bolting the first end section 42 to the frame 30. The second end section 46 of each mounting member 40 is mounted to a respective rail 50 using known mounting methods, such as, but not limited to, bolting the second end section 46 to the rail 50. The second end section 46 of each mounting member 40 may also be mounted to the bottom plate 60 using known mounting methods, such as, but not limited to, bolting the second end section 46 to the bottom plate 60. Alternatively, or additionally, the bottom plate 60 may be mounted to the rails 50 using known mounting methods, such as, but not limited to, bolting the rails 50 to the bottom plate 60. The ribs or rails 50 are mounted to the mounting members 40 and/or the bottom plate 60 in such a manner to allow for the release of the bottom plate 60 when a force is applied to the fuel tanks 10 or the mounting members 40 due to an event. This allows the fuel tanks 10 to be moved downward and/or sideways relative to the chassis of the vehicle and/or sideways or lateral relative to one or more of the frame members 30 to a position in which the fuel tanks are either out of the path of the impact or protected by the chassis of the vehicle. Additional rails 50 may be spaced along the mounting members 40 to provide for additional support and strength.

The mounting members 40 may have a nonlinear cross-section to provide additional strength to the mounting members 40, thereby enhancing the ability of the mounting members 40 to support additional weight and to provide additional crush resistance for the fuel tanks 10. The nonlinear configuration of the mounting members 40 allows for forces applied thereto to be better dissipated over the entire surface of the mounting members 40, thereby preventing lateral forces from being transferred directly to the fuel tanks 10 during an event, such as, but not limited to, a collision, crash or accident. The mounting members 40 may be made from any material having the strength characteristics desired, including, but not limited to, steel and cross-linked polyethylene. Alternatively, the mounting members 40 may be a single, continuous piece of material forming sidewalls, such as, but not limited to, sheet metal, which has the appropriate strength characteristics required to dissipate forces exhibited during an event.

As best shown in FIG. 3, the middle section 44 is dimensioned to have a downward tilt away from the frame members 30. In one embodiment, the angle of the downward tilt is approximately equal to the slope of the sloped wall 24. Consequently, as a lateral force is applied to the mounting members 40, the middle section 44 cooperates with the surface 24 causing the lateral force to be partially translated to a downward force and a lateral force, causing the fuel tanks 10 to be moved downward or sideways away from the frame members 30 and the drive shaft. In so doing, the fuel tank 10 is moved away from the drive shaft during an event, such as, but not limited to, a collision, crash or accident, thereby preventing the fuel tanks 10 from being punctured by the drive shaft. As any force is applied to the mounting members 40 during such an event, the angled middle sections 44 cause the applied forces to exhibit a partial downward force and a partial lateral force on the mounting members 40, causing the mounting members 40 and the fuel tanks 10 to be moved away from one or both of the frame rail members 30 of the vehicle and away from the drive shaft. The movement of the fuel tanks 10 relative to the vehicle and the frame rail members 30 is in a direction which is horizontal or lateral to the direction of the longitudinal axis of the frame rail members 30, in a direction which is vertical or perpendicular to the direction of the longitudinal axis of the frame rail members 30, or in a direction which is both horizontal or lateral to the direction of the longitudinal axis of the frame rail members 30 and vertical or perpendicular to the direction of the longitudinal axis of the frame rail members 30. This allows the fuel tanks 10 to be pushed or moved downwardly and/or laterally by the energy of the impact to a position in which the fuel tanks are either out of the path of the impact or protected by the chassis of the vehicle, for example to a position away from one or more of the frame rail members 30 and the drive shaft of the vehicle.

The spacing of the mounting members 40 along the fuel tanks 10 can be varied depending upon the capacity of the fuel tanks 10 and the amount of protection required to prevent puncture of the fuel tanks 10 during or as a result of such an event. Alternatively, the mounting member 40 may be a solid, continuous member to provide enhanced protection by preventing objects contacting the fuel tanks 10, thereby preventing the fuel tanks 10 from being punctured during an impact or event.

As shown in FIG. 3, rails 50 may have a nonlinear cross-section to provide additional strength to the rails 50, thereby enhancing the ability of the rails 50 to provide additional integrity to the system 12 and to provide additional crush resistance for the fuel tanks 10. The nonlinear configuration of the rails 50 allows for forces applied thereto to be better dissipated over the entire surface of the rails 50, thereby preventing lateral forces from being transferred to the fuel tanks 10 during an event, such as, but not limited to, a collision, crash or accident. The rails 50 may be made from any material having the strength characteristics desired, including, but not limited to, steel and cross-linked polyethylene. Rails 50 extend on the sides of the fuel tanks 10, in front of the fuel tanks 10, behind the fuel tanks 10, or a combination thereof.

In the illustrative embodiment, the base or bottom plate 60 extends below the entire width and length of the fuel tanks 10. As shown in FIG. 3, the bottom plate 60 may have a nonlinear cross-section to provide additional strengthening ribs 66 to the bottom plate 60, thereby enhancing the ability of the bottom plate 60 to provide additional integrity to the system 12 and to provide additional crush resistance for the fuel tanks 10. The nonlinear configuration of the bottom plate 60 allows for forces applied thereto to be better dissipated over the entire surface of the bottom plate 60, thereby preventing damaging forces from being transferred to the fuel tanks 10 during such an event. The bottom plate 60 may be made from any material having the strength characteristics desired, including, but not limited to, steel and cross-linked polyethylene. The strengthening ribs 66 may be spaced periodically along the bottom plate 60 or may be more uniformly distributed, depending upon the material used for the bottom plate 60 and the strength characteristics desired.

The bottom plate 60 protects the fuel tanks 10 from intrusion from below and protects the fuel tanks 10 in the event of a front axle attachment failure and the resulting impact and ground contact. The bottom plate 60 protects the bottom of the fuel tanks 10 from being crushed or punctured and serves as a skid plate if ground contact is made. A front edge 62 (FIG. 4) of the bottom plate 60 may be turned up to allow for protection to the front side of the fuel tanks 10. The bottom plate 60 also provides a location for conventional mounting and location hardware and brackets to mount the fuel tanks 10 to the bottom plate 60. The mounting members 40 may also be mounted to the tank locating brackets attached to the bottom plate 60. In one embodiment, the tank locating bracket may be formed in a U-section with wings which serve as tank retention brackets. With the mounting members 40, rails 50 and bottom plate 60 properly secured, the support structure or cage 80 is properly mounted to the frame rail members 30 of the vehicle.

A guard 70 (FIG. 1) may be positioned between the fuel tanks 10 to provide protection for the tanks 10 in the event of a drive shaft failure. The guard may be made from any material having the strength characteristics desired, including, but not limited to, steel and cross-linked polyethylene.

In operation the support structure or cage 80 is mounted to the frame rail members 30 as described. The fuel tanks 10 are not attached to the frame rail members 30 or the cage 80. Instead, in the illustrative embodiment shown, the fuel tanks 10 rest on the bottom plate 60 of the cage 80. While the fuel tanks 10 are captured by the cage 80 and prevented from movement relative to the vehicle and the cage 80 during normal operation, the fuel tanks 10 may move independent of the vehicle and/or the cage 80 during an impact or event. This allows a portion of the energy or the forces associated with an impact to be absorbed by the cage 80, thereby reducing the energy or force transferred to the fuel tanks 10. For example, in an impact test in which a 4000 pound moving barrier traveling at 30 mile per hour struck the heavy truck and fuel tank at a 30 degree angle measured relative to the longitudinal axis of the fuel tank, the support structure or cage 80 absorbed approximately eight percent of the energy or force of the moving barrier which impacted the support structure 80. However, as the speed of the moving barrier is decreased, the percentage of the energy or force absorbed by the support structure 80 increases.

The support structure or cage 80 is moveable relative to the vehicle and the fuel tanks 10 during an impact of an event such as, but not limited to a collision, crash or accident. In addition, the fuel tanks 10 are moveable relative to the vehicle and the support structure 80 during the impact. This allows the fuel tanks 10 to be moved downward and/or sideways relative to the chassis of the vehicle and/or downward or sideways relative to one or more frame members 30 to a position in which the fuel tanks 10 are either out of the path of the impact or protected by the chassis of the vehicle and/or the cage 80.

As previously described, not only does the cage 80 absorb a percentage of the energy or forces associated with the impact or event, the cage 80 also provides a shield which protects the fuel tanks 10 from being punctured during an event. Consequently as the fuel tanks 10 are displaced during an event, the mounting members 40, rails 50 and bottom surface 60 inhibit or prevent sharp objects or protrusions from contacting the fuel tanks 10. Instead, the protrusions engage the components of the cage 80. As the components of the cage 80 are configured to remain intact, and not puncture during impact, the fuel tanks 10 are protected, thereby reducing the risk of failure of the fuel tanks 10.

In alternate illustrative embodiments, the components of the cage 80 may also have energy dissipating/absorbing material 82, such as, but not limited to, aluminum, polymer or ferrous material attached thereto. The energy dissipating/absorbing material 82 provides additional protection to the fuel tanks, as the energy dissipating/absorbing material 82 further isolates the forces associated with the impact or event from reaching or damaging the fuel tanks 10.

In addition, in alternate exemplary embodiments, the mounting members 40 and rails 50 may be spaced from the sides of the fuel tanks 10, allowing the fuel tanks 10 to more freely float relative to the mount members 40. The spacing allows the mounting member 40 and rails 50 to be deformed by the impact or event prior to contacting the fuel tanks 10, thereby allowing a portion of the energy or the forces of the impact to be better absorbed or displaced by the cage 80.

An alternate illustrative embodiment is shown in FIGS. 5 through 8. In this embodiment, a single fuel tank 110 is shown. While one fuel tank is shown in the fuel tank system 112, other numbers of fuel tanks may be used without departing from the scope of the invention. As one illustrative option, the fuel tanks may be modular, allowing the appropriate number of tanks to be used to accommodate the desired fuel capacity. The material used to form the fuel tanks can be any material which will not degrade or fail when exposed to the fuel (i.e. diesel) which is stored in the fuel tank 110, such as, but not limited to, steel or cross linked polyethylene.

Figure 6:
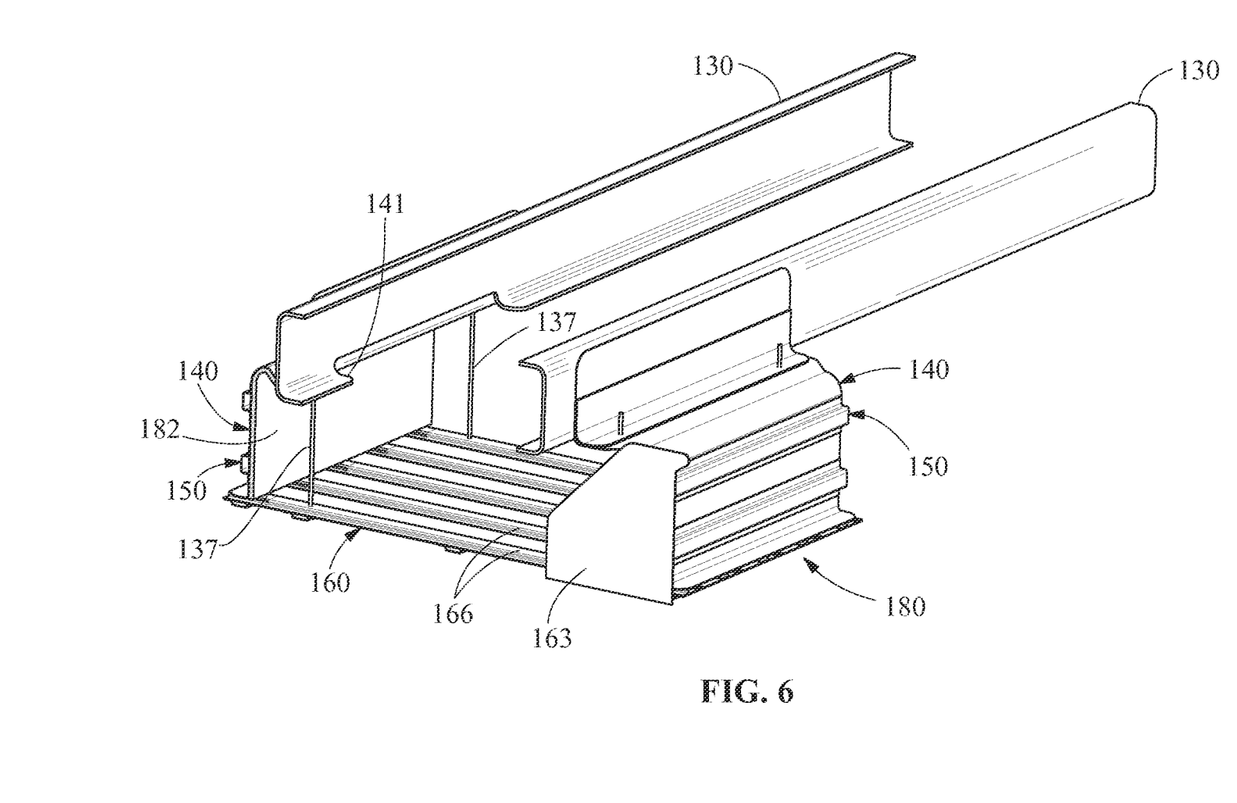
FIG. 6 is a perspective view of the components of the alternate illustrative embodiment of a fuel system shown in FIG. 5 with the fuel tanks removed and both of the vehicle frame rail members shown.
Figure 7:
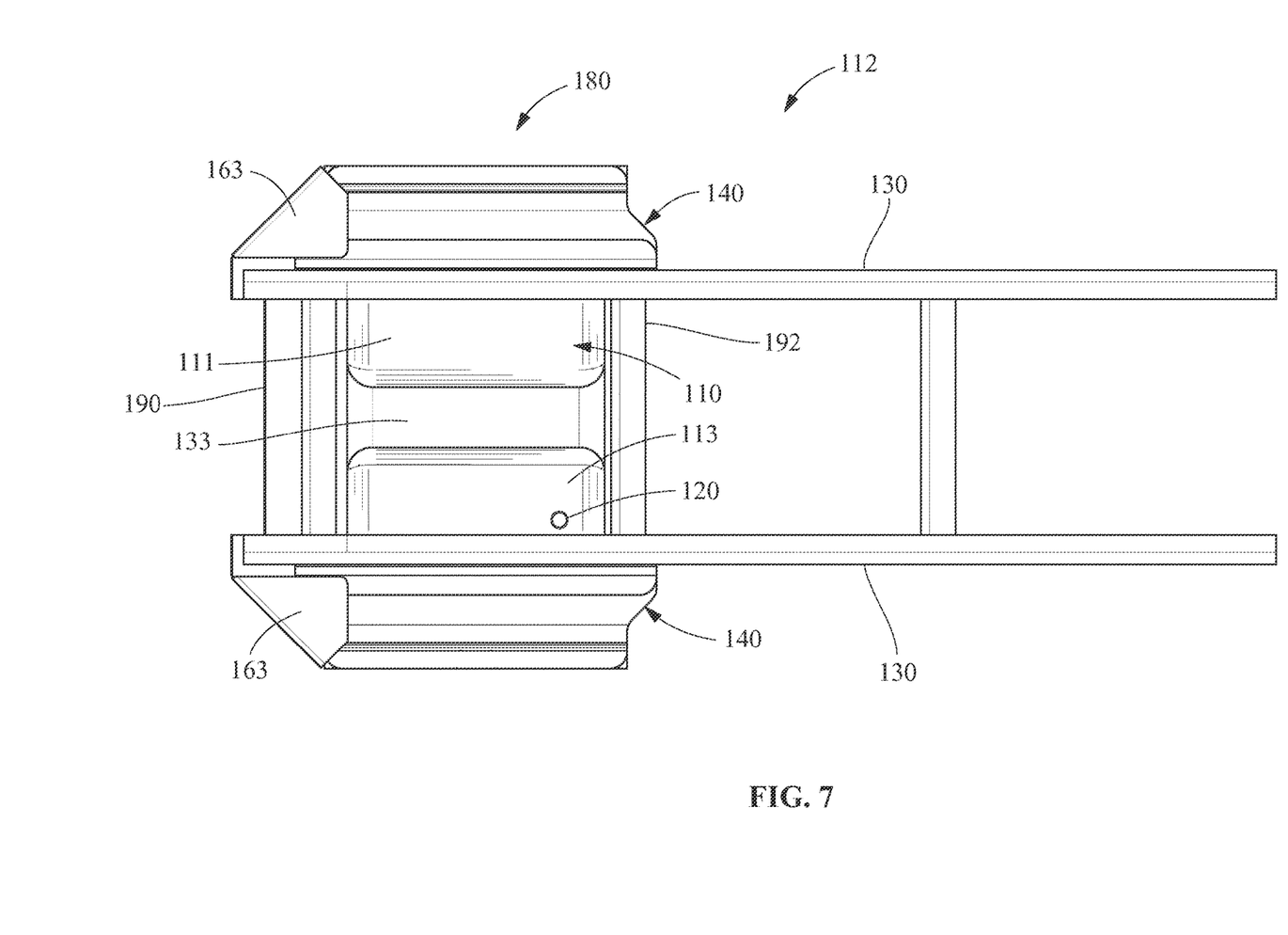
FIG. 7 is a top view of the fuel system of FIG. 5, with both of the vehicle frame rail members shown.

An inlet pipe or tube 120 is secured to the fuel tank 110, for example through a side wall 119 of the tank 110. The inlet tube may be secured to the fuel tank 110 in any known manner. The inlet tube is for the purpose of introducing diesel or other desired fuel into the respective tank 110. The inlet tube may be secured to the fuel tank 110 at various locations, including, but not limited to, near the rearward end of the tank 110. As shown in FIG. 6, openings may be provided through the rail frame members 130 and the mounting member 140 to allow the inlet pipe 120 to access the tank 110. A gasoline feed tube or pipe (not shown) extends from the fuel tank 110, for example through a bottom wall 122, for the purpose of feeding the fuel to the engine of the vehicle. The feed tube or pipe may be located at various locations, including, but not limited to, near the forward end of the tank 110.

Figure 5:
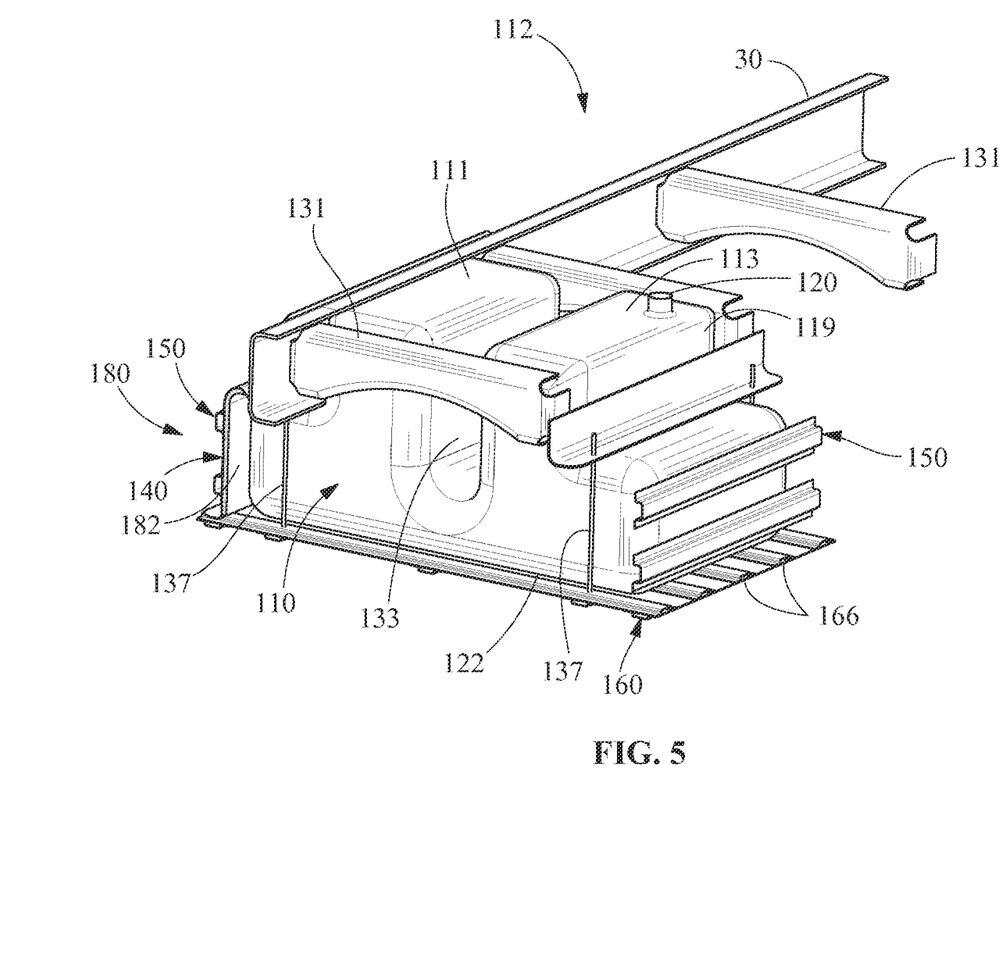
FIG. 5 is a front perspective view of components of an alternate illustrative embodiment of a fuel system according to the present invention, with one of the vehicle frame rail members removed.
Figure 8:
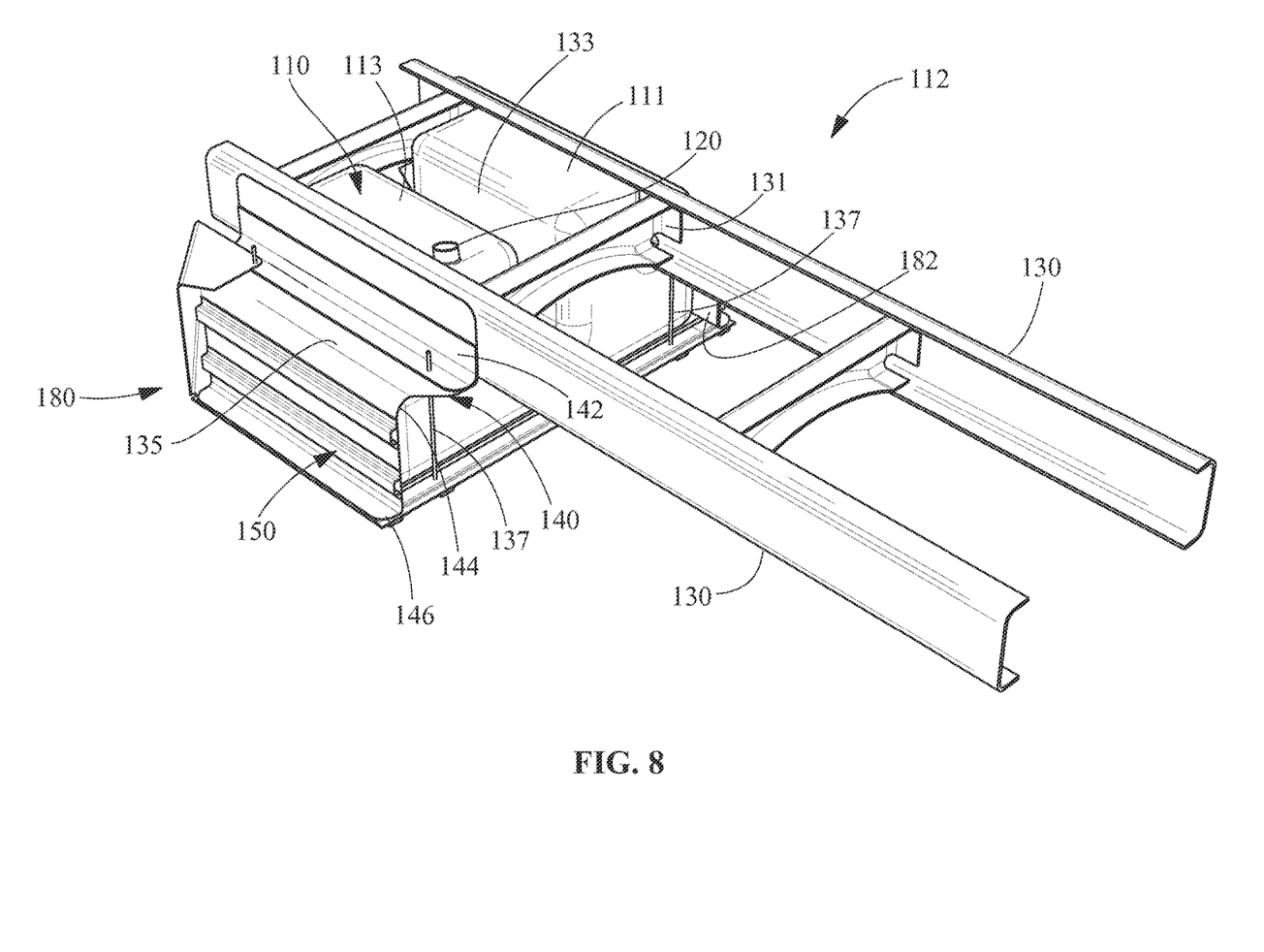
FIG. 8 is a back perspective view of the fuel system of FIG. 5 with both of the vehicle frame rail members shown.

As best shown in FIGS. 5 and 8, the tanks 110 are adapted to be horizontally positioned on the underside of the truck or vehicle so that portions 121 of the tanks 110 are positioned between the frame rail members 130 and cross supports 131 of the truck or motor vehicle. A channel 133 is provided to accommodate the drive shaft or drive line (not shown) of the vehicle. Consequently, a first portion 111 of the fuel tank 110 extends between a first frame member 130 of the truck or vehicle and the drive shaft of the vehicle and a second portion 113 of the fuel tank 110 extends between a second frame member 130 of the truck or vehicle and the drive shaft of the vehicle. It should be understood that the cross section and overall shape of the fuel tank 110 can be of any desired modification based on the space available for the tank 110 and the desired capacity of the tank 110. In the embodiment shown, the rail frame members 130 are notched at 141 (as shown in FIG. 6) to allow for the tank 110 to be positioned between the rail frame members 130. When mounted to the rail frame members 130, the combination of the mounting members 140, rails 150 and base or bottom plate 160 provide additional strength to the rail frame members 130 to compensate for any weakness to the rail frame members 130 caused by the notches 141.

The fuel system 112 includes the fuel tank 110, sidewalls or mounting members 140, at least one rail 150 and at least one bottom plate 160. The mounting members 140, the rail 150 and the bottom plate 60 form a support structure or cage 180 which surrounds the fuel tank 110. As best shown in FIG. 8, the mounting members 140 have an S-shaped configuration with a first end section 142, a middle section 144 and a second end section 146. The first end section 142 of each mounting member 140 is mounted to a respective frame member 130 of the vehicle using known mounting methods, such as, but not limited to bolting the first end section 142 to the frame 130. The second end section 146 of each mounting member 140 is mounted to the bottom plate 160 using known mounting methods, such as, but not limited to bolting the second end section 146 to the bottom plate 160. The second end section 146 of each mounting member 140 may also be mounted to a respective rail 150 using known mounting methods, such as, but not limited to, bolting the second end section 146 to the rail 150. Alternatively, or additionally, the bottom plate 160 may be mounted to the rails 150 using known mounting methods, such as, but not limited to, bolting the rails 150 to the bottom plate 160. The rails are mounted to the mounting members 140 and or the bottom plate 160 in such a manner to allow for the release of the bottom plates 160 when a force is applied to the fuel tank 110 or the mounting members 140 due to an event. This allows the fuel tank 110 to be pushed or moved downwardly and/or laterally by the energy of the impact to a position in which the fuel tank is either out of the path of the impact or protected by the chassis of the vehicle. Additional rails 150 may be spaced along the mounting members 140 to provide for additional support and strength.

As best shown in FIG. 8, the middle section 144 is dimensioned to have a flange 135 which extends away from the frame members 130. Extending from the flange 135 to the bottom plate 160 are one or more support members or struts 137. In the illustrative embodiment shown, the support members or struts 137 are threaded rods. However, other types of support members can be used. The support members or struts 137 provide additional support to the system 112 and maintain the bottom plate 160 in position relative to the rail frame members 130 during normal operation. However, in case of an event, such as, but not limited to, a collision, crash or accident, the support members or struts 137 are designed to fail, causing the bottom plate 160 and the fuel tank 110 to move away from the frame members 130 of the vehicle and the drive shaft. In so doing, the fuel tank 110 is moved away from the drive shaft during such an event, thereby preventing the fuel tank 110 from being punctured by the drive shaft or other parts of the vehicle. The failure of the struts 137 allow the fuel tank 110 to be moved relative to the frame rail members 130 of the vehicle and relative to the drive shaft. The movement of the fuel tank 110 relative to the vehicle and the frame rail members 130 may be, but is not limited to, i) in a direction which is horizontal or lateral to the direction of the longitudinal axis of the frame rail members 130, ii) in a direction which is vertical or perpendicular to the direction of the longitudinal axis of the frame rail members 130, or iii) in a direction which is both horizontal or lateral to the direction of the longitudinal axis of the frame rail members 130 and vertical or perpendicular to the direction of the longitudinal axis of the frame rail members 130. This allows the fuel tank 110 to be pushed or moved downwardly and/or laterally by the energy of the impact to a position in which the fuel tank is either out of the path of the impact or protected by the chassis of the vehicle, for example to a position away from one or more of the frame rail members 130 and the drive shaft of the vehicle.

In the embodiment shown, each mounting member 140 is one continuous piece which extends along the entire side of the fuel tank 110. This configuration prevents objects from contacting the fuel tank 110, thereby preventing the fuel tank 110 from being punctured during an impact or event. However, the configuration of the mounting members 140 can be varied depending upon the capacity of the fuel tank 110 and the amount of protection required to prevent puncture of the fuel tank 110 during or as a result of such an event. For example, the mounting members 140 may be individual members rather than a solid member (similar to that shown in FIGS. 1 through 4).

As shown in FIGS. 5, 6 and 8, rails 150 may have a nonlinear cross-section to provide additional strength to the rails 150, thereby enhancing the ability of the rails 150 to provide additional integrity to the system 112 and to provide additional crush resistance for the fuel tank 110. The nonlinear configuration of the rails 150 allows for forces applied thereto to be better dissipated over the entire surface of the rails 150, thereby preventing lateral forces from being transferred to the fuel tanks 110 during such an event. The rails 150 may be made from any material having the strength characteristics desired, including, but not limited to, steel and cross-linked polyethylene.

In the illustrative embodiment, the bottom plate 160 extends below the entire width and length of the fuel tank 110. As shown in FIG. 6, the bottom plate 160 may have a nonlinear cross-section to provide additional strengthening ribs 166 to the bottom plate 160, thereby enhancing the ability of the bottom plate 160 to provide additional integrity to the system 112 and to provide additional crush resistance for the fuel tank 110. The nonlinear configuration of the bottom plate 160 allows for forces applied thereto to be better dissipated over the entire surface of the bottom plate 160, thereby preventing damaging forces from being transferred to the fuel tank 110 during an event, such as, but not limited to, a collision, crash or accident. The bottom plate 160 may be made from any material having the strength characteristics desired, including, but not limited to, steel and cross-linked polyethylene. The strengthening ribs 166 may be space periodically along the bottom plate 160 or may be more uniformly distributed, depending upon the material used for the bottom plate 160 and the strength characteristics desired.

The fuel tank 110 rests on and is supported by the base or bottom plate 160. The bottom plate 160 protects the fuel tank 110 from intrusion from below and protects the fuel tank 110 in the event of a front axle attachment failure and the resulting impact and ground contact. The bottom plate 160 protects the bottom of the fuel tank 110 from being crushed or punctured and serves as a skid plate if ground contact is made. One or more front plates 163 (FIG. 6) may be attached or integral to the bottom plate 160 and/or the mounting members 140 and/or the rails 150 may be provided to allow for additional protection to the front side of the fuel tank 110. The bottom plate 160 also provides a location for conventional mounting and location hardware and brackets to mount the fuel tank 110 to the bottom plate 160. The mounting members 140 may also be mounted to the tank locating brackets attached to the bottom plate 160. In one embodiment, the tank locating bracket may be formed in a U-section with wings which serve as tank retention brackets. With the mounting members 140, rails 150 and bottom plate 160 properly secured, the support structure or cage 180 is properly mounted to the frame rail members 130 of the vehicle.

A guard (not shown, but similar to that shown in FIGS. 1 through 4) may be positioned in the channel 133 to provide protection for the tank 110 in the event of a drive shaft failure. The guard may be made from any material having the strength characteristics desired, including, but not limited to, steel and cross-linked polyethylene.

In operation the support structure or cage 180 is mounted to the frame rail members 130 as described. The fuel tank 110 is not attached to the frame rail members 130 or the cage 180. Instead, in the illustrative embodiment shown, the fuel tank 110 rests on the bottom plate 160 of the cage 180. While the fuel tank 110 is captured by the cage 180 and prevented from movement relative to the vehicle and the cage 180 during normal operation, the fuel tank 110 may move independent of the vehicle and/or the cage 180 during an event. This allows a portion of the energy or the forces associated with an impact or event to be absorbed by the cage 180, thereby reducing the energy or force transferred to the fuel tank 110. For example, in an impact test in which a 4000 pound moving barrier traveling at 30 mile per hour struck the heavy truck and fuel tank at a 30 degree angle measured relative to the longitudinal axis of the fuel tank, the support structure or cage 80 absorbed approximately eight percent of the energy or force of the moving barrier which impacted the support structure 80. However, as the speed of the moving barrier is decreased, the percentage of the energy or force absorbed by the support structure 80 increases.

The support structure or cage 180 is moveable relative to the vehicle and the fuel tank 110 during an impact of an event such as, but not limited to a collision, crash or accident. In addition, the fuel tank 110 is moveable relative to the vehicle and the support structure 180 during the impact. This allows the fuel tank 110 to be moved downward and/or sideways relative to the chassis of the vehicle and/or downward or sideways relative to one or more frame members 130 to a position in which the fuel tank 110 is either out of the path of the impact or protected by the chassis of the vehicle and/or the cage 180.

In one illustrative embodiment, the support members or struts 137 have sufficient clamping load to restrain a filled fuel tank or tanks in a longitudinal acceleration or deceleration force of up to approximately 1.5 g, which is more than twice what a semi truck is capable of producing an any acceleration or braking maneuver. In the illustrative embodiment shown, the actual clamping force of the support members 137 is approximately 1400 pounds. However, in other embodiments the clamping force may be between 1000 pounds and 2400 pounds. During an impact of an event such as, but not limited to a collision, crash or accident, the support member 137 is configured to fail or fracture thereby releasing its clamping force, allowing the support structure or cage 180 to partially move or collapse relative to the fuel tank or tanks. For example, in on illustrative embodiment, the support member 137 is configured to fail or fracture when a respective mounting member 140 has been displaced to a position approximately flush with the frame rail. However, other configurations for the support member 137 may be used, allowing the fracture to occur at different locations or in response to differing amounts of energy or force applied, either directly or indirectly, thereto.

As previously described, not only does the cage 180 absorb a percentage of the energy or forces associated with the impact or event, the cage 180 also provides a shield which protects the fuel tank 110 from being punctured during an event. Consequently as the fuel tank 110 is displaced during an event, the mounting members 140, rails 150 and bottom surface 160 inhibit or prevent sharp objects or protrusions from contacting the fuel tank 110. Instead, the protrusions engage the components of the cage 180. As the components of the cage 180 are configured to remain intact, and not puncture during impact, the fuel tank 110 is protected, thereby reducing the risk of failure of the fuel tank 110.

In alternate exemplary embodiments, the components of the cage 180 may also have energy dissipating/absorbing material 182, such as, but not limited to, aluminum, polymer or ferrous material attached thereto. The energy dissipating/absorbing material 182 provides additional protection to the fuel tank 110, as the energy dissipating/absorbing material 182 further isolates the forces associated with the impact or event from reaching or damaging the fuel tank 110.

In addition, in alternate exemplary embodiments, the mounting members 140 and rails 150 may be spaced from the sides of the fuel tank 110, allowing the fuel tank 110 to more freely float relative to the mount members 140. The spacing allows the mounting member 140 and rails 150 to be deformed by the impact or event prior to contacting the fuel tank 110, thereby allowing a portion of the energy or the forces of the impact to be better absorbed or displaced by the cage 180.

In alternate exemplary embodiments, the support structure or cage 180 may include a front wall which extend in the front of the fuel tank 110 and/or a rear wall which extends behind the fuel tank 110. The front wall and the back wall provide additional support to the cage 180 and prevent objects from contacting the fuel tank from the front or the back during an impact, thereby preventing the fuel tank from being punctured during the impact. The front wall and the back wall may be attached to the mounting members 140 and the base plate 160 to provide increased rigidity to the support structure or cage 180.

As shown in the illustrative embodiments of FIGS. 1 through 8, the frame members 30, 130, mounting members 40, 140, rails 50, 150 and the bottom plate 60, 160 form a protective area, cage or support area 80, 180 which provides a crush-free zone for the fuel tank(s) 10, 110. The support structure may be provided for support on each side of the vehicle which also acts as a guard for the fuel tank(s) 10, 110. The use of the support structure provides both impact and tearing protection for the fuel tank(s) 10, 110. This support structure also allows mounting of other components such as exhaust, air tanks and emission control systems to the outside of the structure. These mounted components will further act as energy absorbing members, further protecting the fuel tanks. The support structure also allows mounting of additional energy absorbing devices or structures as needed.

The invention, as shown and described with respect to the illustrative embodiments, provides a revised mounting system and a revised location for the fuel system and fuel tanks to improve crashworthiness of the vehicle by reducing the occurrence of tank failure, fuel spillage, fire and/or explosion during and after a collision or similar event, while still providing a sufficient range for the vehicle. The fuel tanks are protected from damage from the side, bottom and between the tanks. The fuel tank mounting system also allows the energy associated with an event to be managed, such as by allowing the fuel tanks to be pushed or moved downwardly and/or laterally by the energy of the impact of a collision or similar event to a position in which the fuel tank is either out of the path of the impact or protected by the chassis or frame of the vehicle.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A fuel tank system for a vehicle, the fuel tank system comprising:
a fuel tank provided proximate frame rail members of the vehicle, a first portion of the fuel tank extending between an extension of a vertical axis of each of the frame rail members and a second portion of the fuel tank extending outside the space defined by the vertical axes of the frame rail members;
a support structure which provides impact protection to the fuel tank, the support structure having mounting members and a base plate, the mounting members mount the support structure to the frame rail members of the vehicle, the base plate extends between the mounting members;
at least a portion of the fuel tank is positioned between the mounting members and the base plate, the fuel tank being supported by the base plate;
the support structure being moveable relative to the vehicle and the fuel tank during an impact, the fuel tank being moveable relative to the vehicle and the support structure during the impact;
wherein as a lateral force is applied to the support structure, the support structure translates the lateral force to a vertical force and a lateral force, allowing the fuel tank to be moved vertically and laterally by the energy of the impact to a position in which the fuel tank is substantially out of the path of the impact or protected by the chassis of the vehicle.

2. The fuel tank system of claim 1, wherein a support member extends between a respective mounting member and the base plate; the support member is configured to fail, allowing the mounting members, the base plate and the fuel tank to move relative to the frame members and the vehicle.

3. The fuel tank system of claim 2, wherein the support member has a clamping load which restrains the fuel tank in a longitudinal acceleration or deceleration force of up to approximately 1.5 g.

4. The fuel tank system of claim 1, wherein the support structure absorbs a portion of the energy or force of the impact, thereby reducing the energy or force transferred to the fuel tank.

5. The fuel tank system of claim 1, wherein rails extend across a portion of the mounting members, the rails have nonlinear cross-sections to provide additional strength to the mounting members.

6. The fuel tank system of claim 1, wherein the base plate has ribs which extend across a portion of the base plate, the ribs have nonlinear cross-sections to provide additional strength to the base plate.

7. The fuel tank system of claim 1, wherein the base plate has a leading edge which is turned up to allow for protection of the fuel tank.

8. The fuel tank system of claim 1, wherein a guard is positioned between the fuel tank and a drive shaft of the vehicle to provide protection of the fuel tank in the event of an impact or a failure of the drive shaft.

9. The fuel tank system of claim 1, wherein energy absorbing material is provided proximate the fuel tank.

10. The fuel tank system of claim 1, wherein the mounting members are spaced from the fuel tank.

11. The fuel tank system of claim 1, wherein the frame members of the vehicle are notched to accommodate the fuel tank.

12. The fuel tank system of claim 1, wherein a guard is positioned between the fuel tank and a drive shaft of the vehicle to provide protection of the fuel tank in the event of an impact or a failure of the drive shaft.

13. A fuel tank system for a truck, the fuel tank system comprising:
a fuel tank provided proximate frame rail members of the vehicle, a first portion of the fuel tank extending between an extension of a vertical axis of each of the frame rail members and a second portion of the fuel tank extending outside the space defined by the vertical axes of the frame rail members;

a support structure which provides impact protection to the fuel tank, the support structure having mounting members and a base plate, the mounting members mount the support structure to frame members of the truck, the base plate extends between the mounting members;

the fuel tank being supported by the base plate;

the fuel tank being moveable relative to the vehicle and the support structure during an impact; and as a lateral force is applied to the support structure, the support structure translates the lateral force to a vertical force and a lateral force, allowing the fuel tank to be moved vertically and laterally by the energy of the impact to a position in which the fuel tank is substantially out of the path of the impact or protected by the chassis of the vehicle, thereby protecting the fuel tank from being crushed or punctured during the impact.

14. The fuel tank system of claim 13, wherein the support structure absorbs a portion of the energy or force of the impact, thereby reducing the energy or force transferred to the fuel tank.

15. The fuel tank system of claim 14, wherein a support member extends between a respective mounting member and the base plate; the support member is configured to fail, allowing the mounting members, the base plate and the fuel tank to move relative to the frame members and the vehicle, the support member has a clamping load which restrains the fuel tank in a longitudinal acceleration or deceleration force of up to approximately 1.5 g.

16. The fuel tank system of claim 15, wherein rails extend across a portion of the mounting members and ribs extend across a portion of the base plate, the rails and ribs have nonlinear cross-sections to provide additional strength to the mounting members and the base plate.

17. A fuel tank system for a truck, the fuel tank system comprising:

a fuel tank provided proximate frame rail members of the vehicle, a first portion of the fuel tank extending between an extension of a vertical axis of each of the frame rail members and a second portion of the fuel tank extending outside the space defined by the vertical axes of the frame rail members;

a support structure which provides impact protection to the fuel tank, the support structure having sidewalls and a base plate, the sidewalls mount the support structure to frame members of the truck, the base plate extends between the sidewalls;

the fuel tank being supported by the base plate;

the support structure being moveable relative to the vehicle and the fuel tank during an impact the fuel tank being moveable relative to the vehicle and the support structure during the impact; and as a lateral force is applied to the support structure, the support structure absorbs a first portion of energy of the impact to protect the fuel tank from being crushed or punctured during the impact, the support structure translates the remaining lateral force to a vertical force and a lateral force, allowing the fuel tank to be moved vertically and laterally by the energy of the impact to a position in which the fuel tank is substantially out of the path of the impact or protected by the chassis of the vehicle.

18. A fuel tank system for a vehicle, the fuel tank system comprising:

a fuel tank;

a support structure which provides impact protection to the fuel tank, the support structure having mounting members and a base plate, the mounting members mount the support structure to frame members of the vehicle, the base plate extends between the mounting members;

rails extend across a portion of the mounting members, the rails have nonlinear cross-sections to provide additional strength to the mounting members; at least a portion of the fuel tank is positioned between the mounting members and the base plate, the fuel tank being supported by the base plate;

the support structure being moveable relative to the vehicle and the fuel tank during an impact, the fuel tank being moveable relative to the vehicle and the support structure during the impact;

wherein the support structure protects the fuel tank from being crushed or punctured during the impact.

19. A fuel tank system for a truck, the fuel tank system comprising:

a fuel tank;

a support structure which provides impact protection to the fuel tank, the support structure having mounting members and a base plate, the mounting members mount the support structure to frame members of the truck, the base plate extends between the mounting members;

rails extend across a portion of the mounting members and ribs extend across a portion of the base plate, the rails and ribs have nonlinear cross-sections to provide additional strength to the mounting members and the base plate;

a first portion of the fuel tank extends between a first frame member of the truck and a drive shaft of the truck, a second portion of the fuel tank extends between a second frame member of the truck and the drive shaft of the truck, the fuel tank being supported by the base plate;

the fuel tank being moveable relative to the vehicle and the support structure during an impact; and the support structure protects the fuel tank from being crushed or punctured during the impact.

* * * * *